(12) United States Patent
Lin

(10) Patent No.: US 7,443,451 B2
(45) Date of Patent: Oct. 28, 2008

(54) DISPLAY DEVICE FOR SIMULTANEOUSLY RECEIVING DIGITAL SIGNAL AND ANALOG DISPLAY SIGNAL

(75) Inventor: Yet-Zen Lin, Taipei (TW)

(73) Assignee: Tatung Co., Ltd., Taipei (TW)

( * ) Notice: Subject to any disclaimer, the term of this patent is extended or adjusted under 35 U.S.C. 154(b) by 567 days.

(21) Appl. No.: 11/154,690

(22) Filed: Jun. 17, 2005

(65) Prior Publication Data

US 2006/0017849 A1    Jan. 26, 2006

(30) Foreign Application Priority Data

Jul. 20, 2004    (TW) .............................. 93211454 U

(51) Int. Cl.
*H04N 3/27* (2006.01)
*H04N 5/50* (2006.01)
*H04N 7/01* (2006.01)

(52) U.S. Cl. .................. 348/554; 348/731; 348/448

(58) Field of Classification Search ................ 348/725, 348/554–557, 731, 728, 581, 582, 561, 562, 348/448, 441; 725/68, 85, 139, 151; *H04N 5/44, H04N 3/27, 5/46, 5/50, 9/74, 7/01*
See application file for complete search history.

(56) References Cited

U.S. PATENT DOCUMENTS

| | | | | |
|---|---|---|---|---|
| 6,118,486 | A * | 9/2000 | Reitmeier | 348/555 |
| 7,068,322 | B2 * | 6/2006 | Tsubouchi | 348/729 |
| 7,092,042 | B2 * | 8/2006 | Ikeguchi | 348/725 |
| 7,322,039 | B2 * | 1/2008 | Tsubouchi et al. | 348/731 |

* cited by examiner

*Primary Examiner*—Sherrie Hsia
(74) *Attorney, Agent, or Firm*—Bacon & Thomas, PLLC

(57) ABSTRACT

A display device can simultaneously receive digital display signal and analog display signal and display a television program corresponding to one of the signals on a display panel. The display device includes the following components: a digital tuner, an analog/digital converter, a video decoder, an audio decoder, a de-interlacer, a scaler, a display driver, a display panel, an audio amplifier, and a speaker. The display device allows the user to watch a television program corresponding to the digital display signal or the analog display signal on the display panel and listen to amplified television audio signal from the speaker.

7 Claims, 1 Drawing Sheet

DISPLAY DEVICE FOR SIMULTANEOUSLY RECEIVING DIGITAL SIGNAL AND ANALOG DISPLAY SIGNAL

BACKGROUND OF THE INVENTION

1. Field of the Invention

The present invention relates to a display and, more particularly, to a display capable of simultaneously receiving digital and analog display signals.

2. Description of the Related Art

Before HDTV (High Definition Television) comes into existence, a traditional television could only receive analog television signal from a distant source, and after serial decoding and image processing procedures, would display a program corresponding to the analog television signal on the screen of the traditional television. After the appearance of HDTV, to achieve higher resolutions, analog television signals have been replaced by digital television signals, which have similar procedures to perform.

However, these two different types of television have incompatible circuit designs; therefore, a television manufacturer can only choose one of the two types to manufacture. The number of programs adapted to digital television signals is far less than the programs adapted to analog television signals, therefore it is a dilemma when to the consumer has to decide which kind of television to buy, i.e., HDTV programs of ultimate imagery yet few in number versus ample programming but of inferior quality. Thus, there is a general need for providing a system which receives digital display signal and analog display signal simultaneously to mitigate and/or obviate the aforementioned problems.

BRIEF SUMMARY OF THE INVENTION

Accordingly, an embodiment of the present invention is directed to a display device which can receives digital display signal and analog display signal simultaneously.

To achieve these and other advantages, and in accordance with the purpose of the present invention as embodied and broadly described, there is provided a display device for receiving digital and analog display signal simultaneously, and displaying a television program corresponding to one of the two display signals on a display panel of the display device. The display device comprises: a digital tuner for inputting and performing a digital demodulation process on the digital display signal so as to output a digital video signal; an analog/digital converter for performing a digitizing process and outputting a digital image signal; an analog tuner for inputting and performing an analog demodulation process on the analog display signal so as to output an analog video signal; a video decoder for performing a video decoding process on the image signals and then outputting an interlaced image signal; a scaler for inputting the de-interlaced image signal and performing an up-scaling/down-scaling process and outputting a television image; a display panel; and a display driver for driving the display panel according to the television image so as to display the television program on the display panel. Wherein the display panel may be a liquid crystal display (LCD), plasma display panel (PDP), LCOS, or projector, and the interlaced video image signal match an NTSC video standard.

Additional features and advantages of the present invention will be set forth in part in the description which follows, and in part will be obvious from the description, or may be learned by practice of the present invention. The features and advantages of the present invention will be realized and attained by means of the elements and combinations particularly pointed out in the henceforth appended claims.

The accompanying drawings, which are incorporated in and constitute a part of this specification, illustrate several embodiments of the present invention and together with the description, serve to explain the principles of the present invention.

DESCRIPTION OF THE EMBODIMENTS

Figure 1:
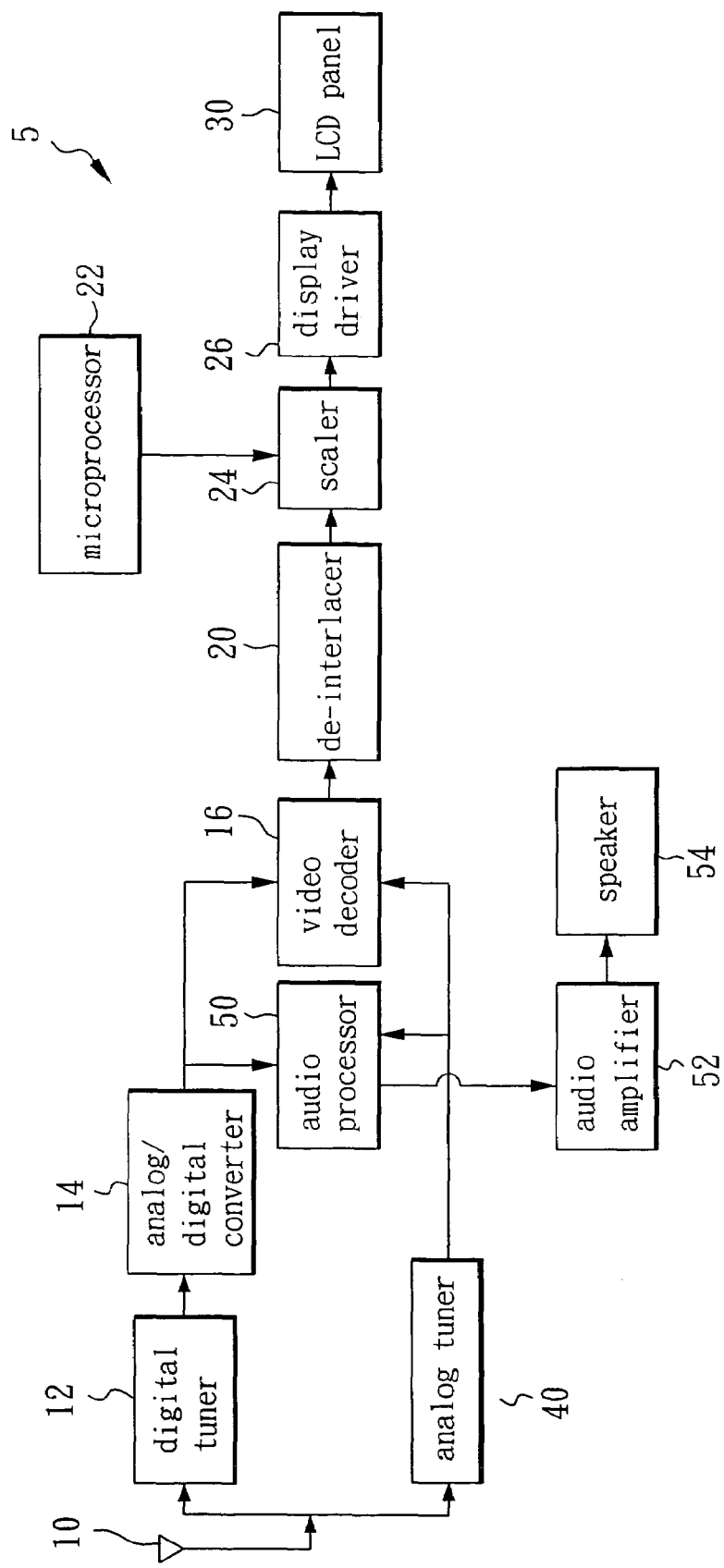
FIG. 1 is a functional block drawing of a liquid crystal display television according to the present invention.

Reference will now be made in detail to present embodiments of the present invention, examples of which are illustrated in the accompanying drawings. Wherever possible, the same reference numbers will be used throughout the drawings to refer to the same or like parts.

As shown in FIG. 1, an LCD television 5 is an exemplary display device in accordance with the present invention for receiving digital and analog display signal simultaneously. The LCD television 5 comprises the following components:

A signal receiver 10 (preferably an antenna) is used for receiving a transmitted signal input from a remote source and then outputting the transmitted signal to a digital turner 12 and an analog tuner 40 respectively.

The digital tuner 12 is used for inputting and performing a digital demodulation process on the transmitted signal so as to output a digital video signal. After a series of signal processes, a digital television image can be obtained from the digital video signal and adopted for displaying on an LCD panel 30. Moreover, the digital tuner 12 can further perform an error correction on the transmitted signal and the digital demodulation process is preferably responding to a quadrature amplitude modulation (QAM).

An analog/digital converter (ADC) 14 is used for performing an analog to digital converting upon the video signal and then outputs a digital image signal.

The video decoder 16 is preferably manufactured by the Phillips Co., model number SAA7118. The video decoder 16 performs a video decoding process, according to a television system image standard, such as NTSC, PAL, or SECAM, on the digital image signal output from the ADC 14 and the composite signal output from the analog tuner 40 and then outputs an interlaced image signal.

The de-interlacer 20 is used for inputting the interlaced image signal and performing a de-interlacing process, changing the interlaced image signal to a de-interlaced image signal, and then outputting a de-interlaced image signal.

The micro controller 22 is used for outputting a configuration based on the demand of the user to a scaler 24, therefore the television image displayed by the LCD panel 30 will be adjusted according to the display parameters to satisfy user preferences.

The scaler 24 is used for inputting the de-interlaced image signal and performing an up-scaling/down-scaling process on the de-interlaced image signal based on the display parameters from the micro controller 22 or the resolution of the LCD panel 30, to output digital television images.

The display driver 26 is used for driving an LCD panel 30 in accordance with the digital television image and therefore a digital television program will be displayed on the LCD panel 30. Furthermore, the LCD panel 30 may be replaced by another display device type, such as a PDP, an LCOS, a projector, etc.

The analog tuner 40 is used for inputting the transmitted signal and performing an analog tuning process and outputting the composite signal to the video decoder 16. The video decoder 16 will perform procedures similar with the foregoing description.

For audio signal processing, the ADC 14 can output a digital audio signal to an audio processor 50. Furthermore, the analog tuner 40 can also output an analog audio signal to the audio processor 50. The audio processor 50 is preferably manufactured by Micronas Co., model No. MSP3445G, which can perform audio processing upon the digital audio signal and the analog audio signal to generate a television audio signal conforming to the multi channel television sound (MTS) standard and outputting the television audio signal. An audio amplifier 52 is used for receiving the television audio signal and performing a signal amplification process to drive a speaker 54, the amplified television audio signal providing audio for the television. The speaker 54 can be a headphone or other audio output device.

Accordingly, both an analog television signal (composite signal) and a digital television signal can be received by the LCD television 5, which is a significant improvement over the prior art.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A display device for simultaneously receiving digital and analog display signal and displaying a television program corresponding to one of the signals on a display panel, the display device comprising:

a digital tuner for inputting and performing a digital demodulation process on the digital display signal so as to output a digital video signal;

an ADC (analog/digital converter) for performing a digitizing process on the digital video signal and outputting a digital image signal;

an analog tuner for inputting and performing an analog demodulation process on the analog display signal so as to output an analog image signal;

a video decoder for performing a video decoding process on the image signals and then outputting an interlaced image signal;

a de-interlacer for performing a de-interlace process on the interlaced image signal to output a de-interlaced image signal;

a scaler for inputting the de-interlaced image signal and performing an up-scaling/down-scaling process and outputting a television image;

a display panel; and a display driver for driving the display panel according to the television image so as to display the television program on the display panel.

2. The display device as claimed in claim 1, wherein the interlaced video image signal conforms to an NTSC video standard.

3. The display device as claimed in claim 1, wherein the display device further comprises a microprocessor for outputting a configuration to the scaler for modifying the up-scaling/down-scaling process.

4. The display device as claimed in claim 1, wherein the display panel is a liquid crystal display panel.

5. The display device as claimed in claim 1, wherein the display panel is a plasma display panel.

6. The display device as claimed in claim 1, wherein the ADC also outputs a digital audio signal, the analog tuner also outputs an analog audio signal.

7. The display device as claimed in claim 6, wherein the display device further comprises:

an audio processor for performing an audio process to the audio signal and then outputting a television audio signal;

a speaker; and an audio amplifier for receiving the television audio signal and performing a signal amplification process, and then driving the speaker to provide audio output with the amplified television audio signal;

wherein the television audio signal conforms to a multi channel television sound (MTS) standard.

* * * * *